United States Patent
Romano et al.

(10) Patent No.: US 6,269,366 B1
(45) Date of Patent: Jul. 31, 2001

(54) METHOD FOR RANDOMLY COMBINING IMAGES WITH ANNOTATIONS

(75) Inventors: Charles E. Romano; Xin Wen, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/103,597

(22) Filed: Jun. 24, 1998

(51) Int. Cl.$^7$ .................................................. G06F 17/30
(52) U.S. Cl. ..................... 707/6; 707/3; 707/10; 707/104; 345/473
(58) Field of Search ........................... 707/515, 512, 707/104, 1, 3, 6, 10; 345/435, 328, 326, 473; 364/188, 468.24

(56) References Cited

U.S. PATENT DOCUMENTS

| | | | |
|---|---|---|---|
| 5,031,121 | * | 7/1991 | Iwai et al. ............................. 707/515 |
| 5,638,502 | * | 6/1997 | Murata ................................. 395/135 |
| 5,659,742 | * | 8/1997 | Beattie et al. ........................ 707/104 |
| 5,680,535 | * | 10/1997 | Harbin et al. ......................... 395/173 |
| 5,734,915 | * | 3/1998 | Roewer ................................. 707/512 |
| 5,765,176 | * | 6/1998 | Bloomberg ............................ 707/514 |
| 5,831,590 | * | 11/1998 | Ikedo ..................................... 345/113 |
| 5,880,740 | * | 3/1999 | Halliday et al. ...................... 345/435 |
| 5,966,122 | * | 10/1999 | Itoh ....................................... 345/328 |
| 6,012,069 | * | 1/2000 | Shibazaki ............................. 707/104 |
| 6,026,411 | * | 2/2000 | Delp ..................................... 707/104 |
| 6,041,335 | * | 3/2000 | Merritt et al. ........................ 707/512 |

OTHER PUBLICATIONS

Sedgewick, "Algorithms", Addison–Wesley Publishing Company, Inc, pp. 33–37, 1983.*

Ramesh et al., "Automatic selection of tuning parameters for feature extraction sequences", IEEE 1994, pp. 672–677.*

* cited by examiner

Primary Examiner—Wayne Amsbury
Assistant Examiner—Thuy N. Pardo
(74) Attorney, Agent, or Firm—Peyton C. Watkins; Stephen H. Shaw

(57) ABSTRACT

A method for producing an image, the method comprises the steps of: storing a plurality of theme images; storing a plurality of annotations; providing a random number generator for randomly selecting the theme images and annotations; and combining the theme image and the annotation.

46 Claims, 4 Drawing Sheets

METHOD FOR RANDOMLY COMBINING IMAGES WITH ANNOTATIONS

FIELD OF THE INVENTION

The invention relates generally to the field of digital image processing and, more particularly, to such processing which randomly composites one of a plurality of templates with a predetermined user image such that the random selection of the template is from one of a plurality of categories where specific category selection is based on user input.

BACKGROUND OF THE INVENTION

Presently, digital image processing includes methods and systems for compositing a template and a predetermined user image. Such systems typically include a computer workstation having a database that includes a plurality of images from which the user selects for combining with the user-defined image. The user images are input into the computer workstation via any suitable means, such as scanning and the like. The user is then permitted to re-composite the user-defined image with another template until a desired result is reached.

Although the presently known and utilized methods and systems are satisfactory, they include drawbacks. The image processing systems are highly structured and deterministic so that the user is not presented with an element of surprise.

Consequently, a need exists for compositing templates with predetermined user images that overcome the above-described drawback.

SUMMARY OF THE INVENTION

The present invention is directed to overcoming one or more of the problems set forth above. Briefly summarized, according to one aspect of the present invention, the invention resides in a method for producing an image, the method comprising the steps of: storing a plurality of theme images; storing a plurality of annotations; providing a random number generator for randomly selecting the theme images and annotations; and combining the theme image and the annotation.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

An advantage of the present invention is that it provides an element of surprise to the users since the particular template is randomly selected and not known by the user before viewing.

Another advantage of the present invention is that it is entertaining and intriguing to users.

A further advantage of the present invention is that it permits automated compositing based on natural language input.

Still another advantage of the present invention is that it also eliminates time-consuming, manual reviews of templates.

DETAILED DESCRIPTION OF THE INVENTION

In the following description, the present invention will be described in the preferred embodiment as a software program. Those skilled in the art will readily recognize that the equivalent of such software may also be constructed in hardware.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figures 1, 2:
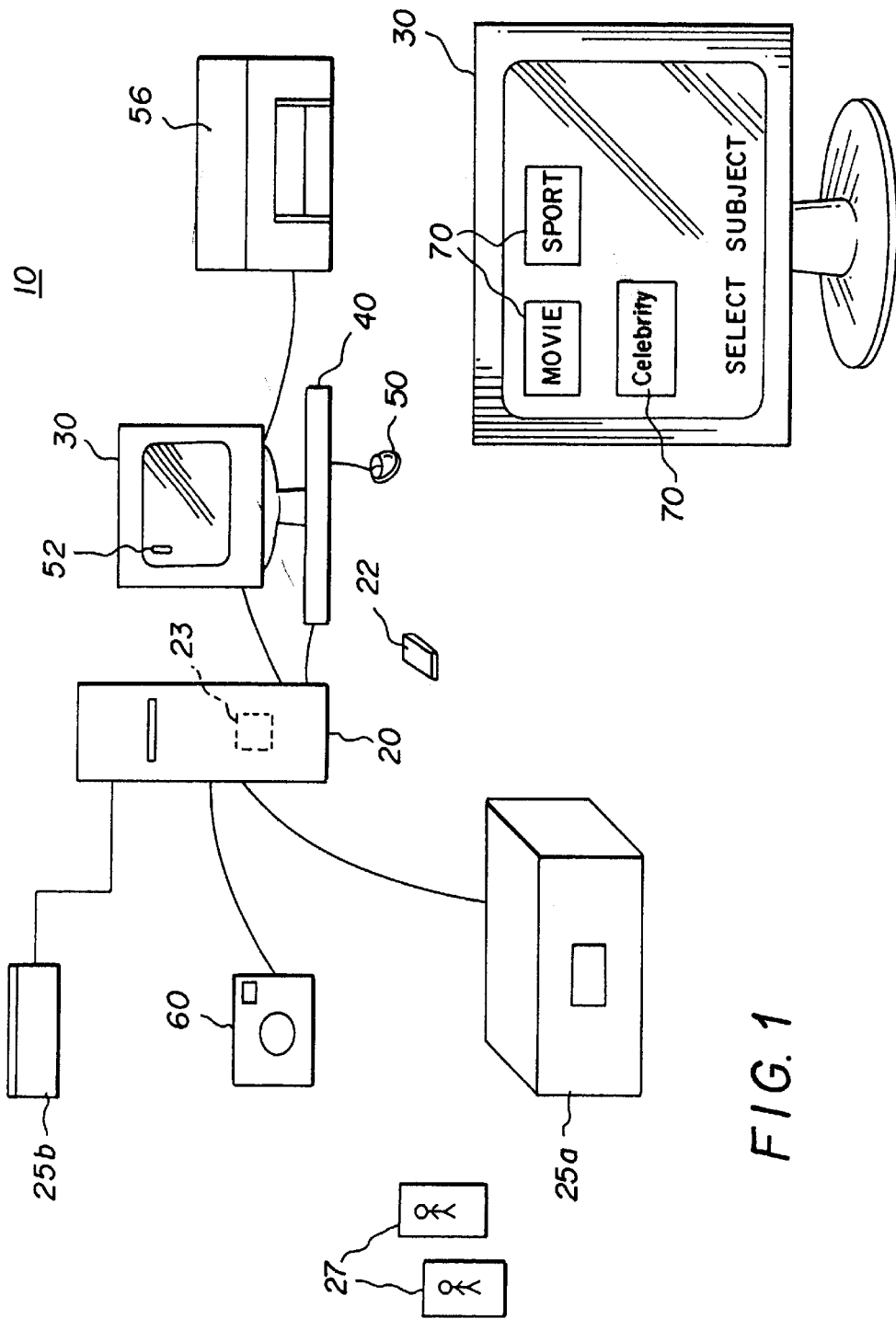
FIG. 1 is an illustration of an image processing apparatus for implementing the present invention.
FIG. 2 is a front view of the monitor of the image processing apparatus illustrating categories for user selection.

Referring now to the drawings, and particularly to FIG. 1, there is illustrated an image processing apparatus 10 that may be used for implementing the present invention. The image processing apparatus 10 includes a microprocessor-based unit 20 for receiving and processing software programs and for performing other processing functions. Software programs may be received by the microprocessor-based unit 20 either from a floppy disk 22 which is inserted into the microprocessor based unit 20, or pre-programmed into memory 23 contained in the microprocessor based unit 20.

A scanner 25 (either a film scanner 25a or print scanner 25b) is electrically connected to the microprocessor-based unit 20 for digitizing images 27 that are placed on the scanner 25, and for sending the digitized image to the microprocessor-based unit 20. The digitized image contains a plurality of pixels each having a value typically between a minimum value (for example 0) and a maximum value (for example 255).

A display 30 is electrically connected to the microprocessor-based unit 20 for displaying user-related information associated with the software. A keyboard 40 is also connected to the microprocessor-based unit 20 for allowing a user to input information to the software. As an alternative to using the keyboard 40 for input, a mouse 50 may be used for moving a selector 52 on the display 30 and for selecting an item on which the selector 52 overlays, such as generally referred to in the art as cutting, copying and pasting, or adjusting a user-interface object such as a slider.

An alternative method of inputting software programs and digitized images to the microprocessor-based unit 20 includes connecting a compact disk-read only memory (CD-ROM) 55 to the microprocessor based unit 20 for receiving software programs and images, and for providing a means of inputting the software programs and other information to the microprocessor-based unit 20. The CD-ROM receives the software and images via a compact disk 60 on which the software and images are stored, and which compact disk 60 is inserted into the CD-ROM 55 for operability. A printer 56 is connected to the microprocessor-based unit 20 for printing a hardcopy of the output of the image processing apparatus 10.

Still further, a digital camera 60 may be electrically connected to the microprocessor-based unit 20 for directly inputting digitized images thereto.

Referring to FIG. 2, there is illustrated a plurality of categories 70 that are presented to the user on the monitor 30. A software of the present invention is programmed into a microcontroller (see FIG. 3) for directing the display of the categories. Such categories may be, for example, movies, sports, celebrities, and political figures, although other categories may also be used.

Figure 3:
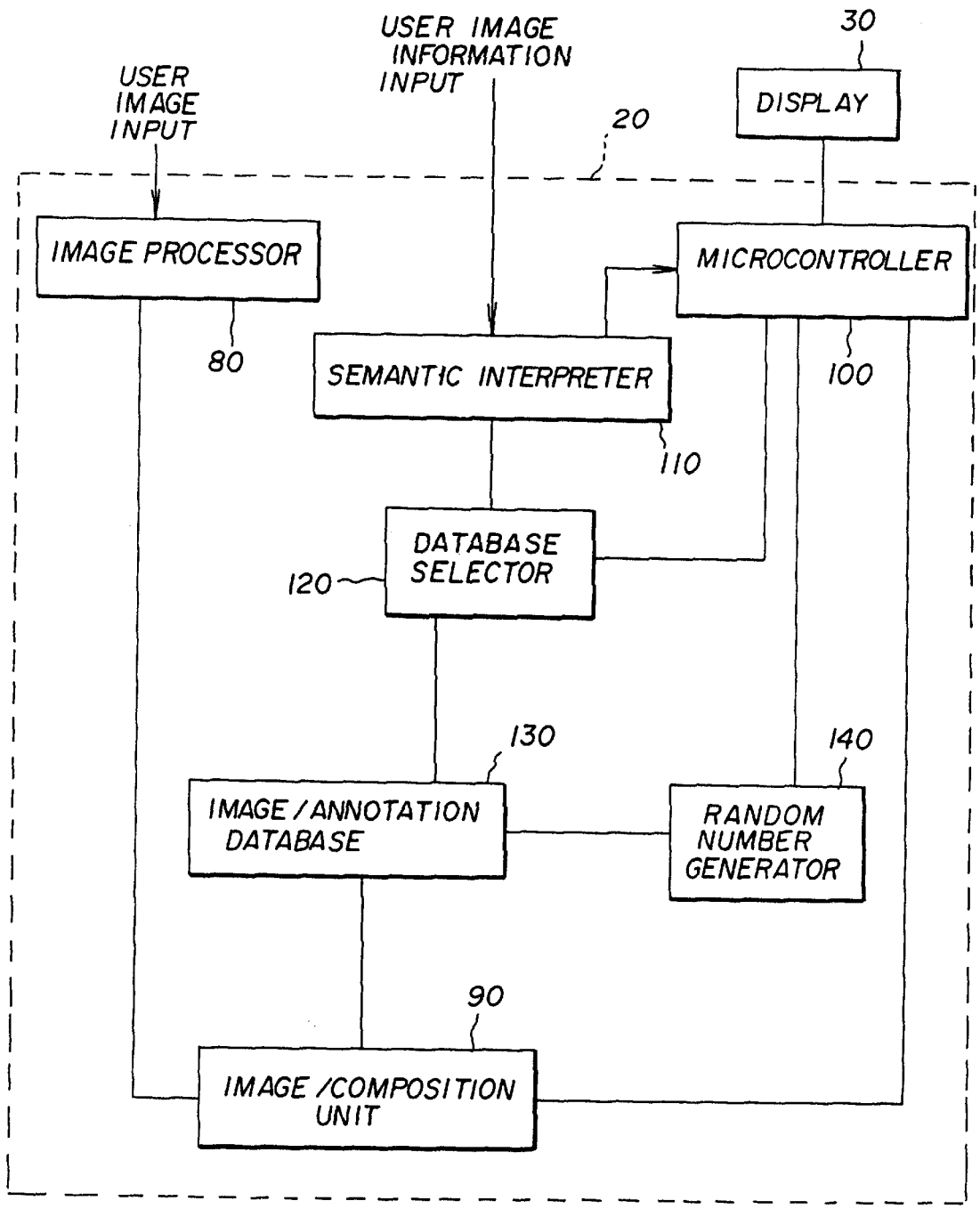
FIG. 3 is a block diagram of the image composition system of the present invention;.

Referring to FIG. 3, there is illustrated a block diagram of the present invention that is preferably implemented in the above-described microprocessor-based unit 20 of the image processing apparatus 10. Before describing the invention further, it facilitates understanding to note that the microcontroller 100 directs operation of the individual components of the present invention so that the below described interaction of the individual components are achieved. Turning now to the particulars of the invention, digitized images are input by a user to the microprocessor-based unit 20 via any of the above-described means. Information related to the user image is also input to the microprocessor-based unit 20, as described below. The images are passed to an image processor 80 where they may be processed for enhancement, such as sharpening, tone scale adjustment, color mapping and the like. The processed images are then sent to an image composition unit 90 where it will be composited with a template, as described herein below.

The microcontroller 100 then prompts the user to input written answers in response to a series of queries that are presented on the monitor 30. These answers become the user profile, and such input is preferably performed on the keyboard. Such queries may be, for example, name, favorite sport, favorite hobby and the like. The user profile is interpreted by a semantic interpreter 110 that converts the user profile into a computer-usable form suitable for use by a database selector 120.

Figure 4:
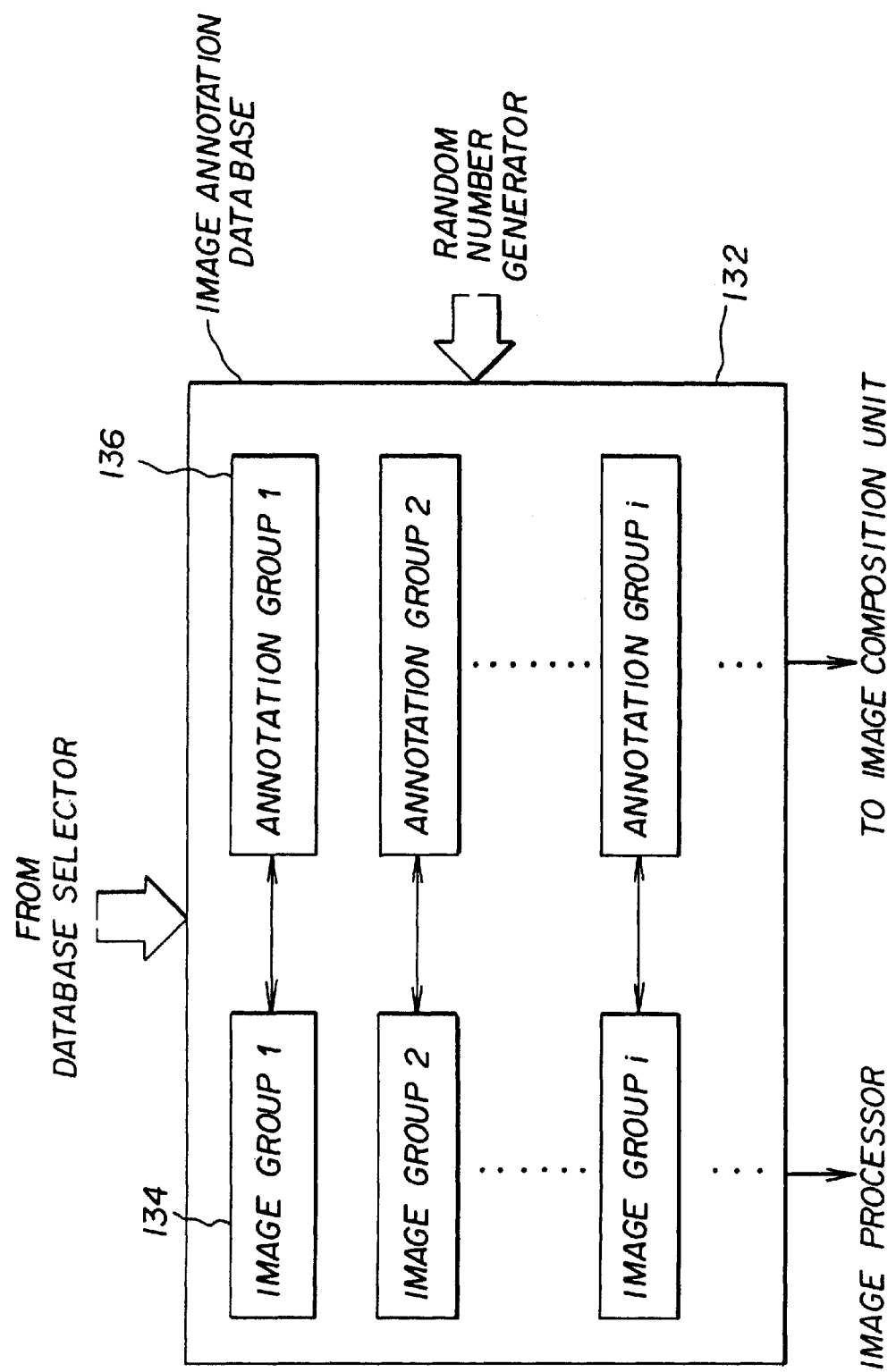
FIG. 4 is a diagram illustrating a typical database of the present invention.

The database selector 120 then retrieves the database containing the previously selected category from an image/annotation database 132. Referring briefly to FIG. 4, the database 132 includes a plurality of image groupings 134 in which each grouping contains a plurality of predetermined images (see FIG. 5). Each image grouping 134 is mated with an annotation grouping 136 that contains a plurality of annotations (see FIG. 5). It is instructive to note that, although only one database 132 is illustrated for purposes of brevity, each category includes its own unique database in the database selector having image groupings and annotation groupings. The database selector analyzes the user profile input form the semantic interpreter 110, and retrieves the image grouping 134 most relevant to the user profile.

Figure 5:
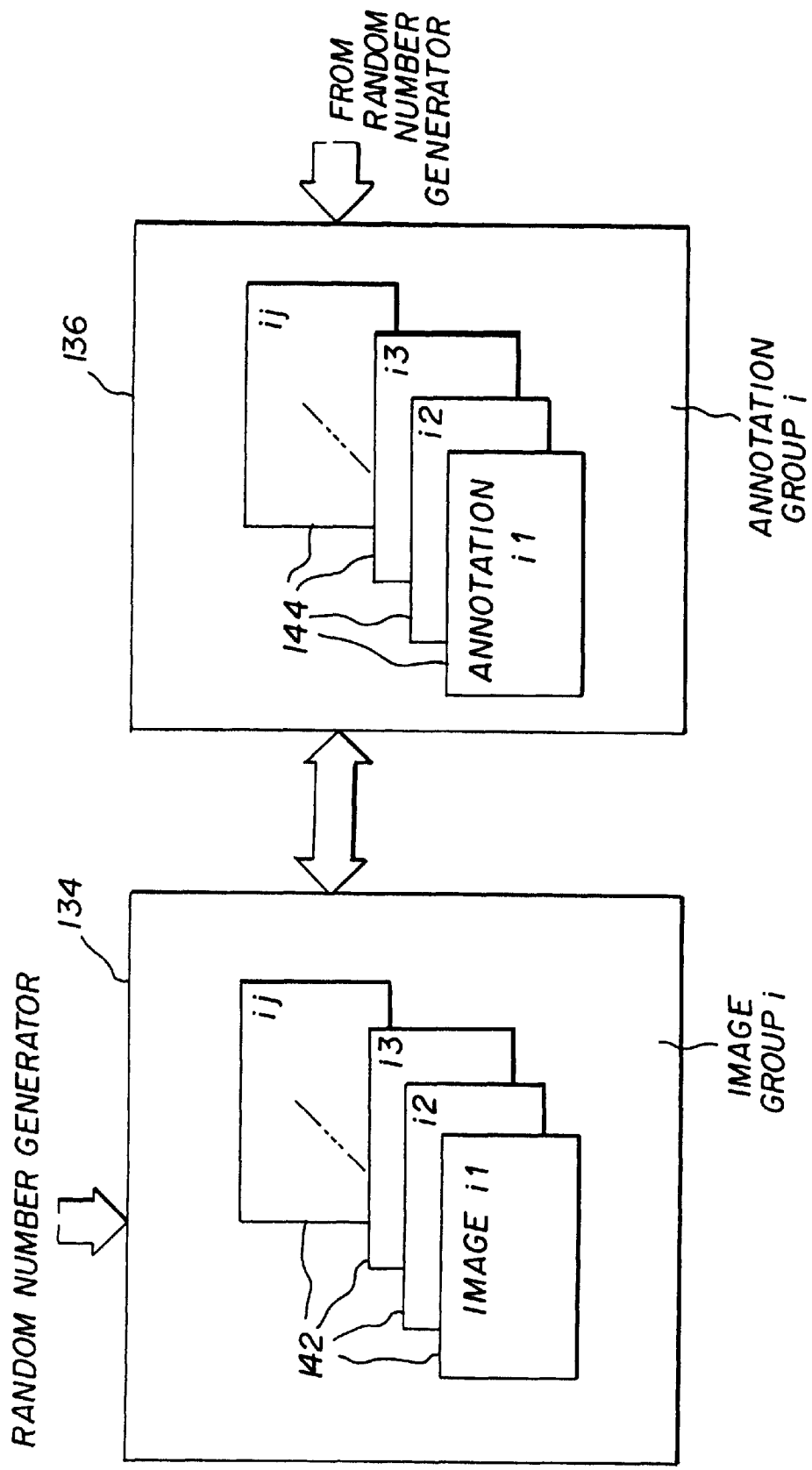
FIG. 5 is a further detailed illustration of FIG. 4.

Referring to both FIGS. 3 and 5, a the random number generator 140 then randomly selects a particular image 142 from the previously selected image grouping 134, and also randomly selects an annotation 144 from the annotation grouping 136 mated with the previously selected image grouping 134.

Referring only to FIG. 3, the particular selected image 142 is then passed through the image processor 80 for processing, as described herein above, and finally into the image composition unit 90. The particular selected annotation 144 is also passed to the image composition unit 90 where the image inputted by the user and the image retrieved from the database are combined into a single image. Such image composition is well known in the art and will not be described in detail herein. The annotation is then written onto the combined image for forming a personalized image for the user.

The combined image is displayed on the monitor 30 for viewing by the user. The monitor 30 also includes a menu, prompted by the microcontroller 100, for permitting the user to retrieve another random image and annotation, or for inputting another user profile. If this option is selected, the random number generator 140 then repeats the above-described process. If not, the microcontroller 100 directs the display of the original menu of categories are displayed on the monitor 30 for permitting another use of the personalized image process.

The invention has been described with reference to a preferred embodiment. However, it will be appreciated that variations and modifications can be effected by a person of ordinary skill in the art without departing from the scope of the invention.

What is claimed is:

1. A method for producing a personalized composite image, the method comprising the steps of:
    (a) storing a plurality of image groupings that each contain a plurality of stored images;
    (b) storing a plurality of annotation groupings that each contain a plurality of annotations, the annotation groupings being mated to the image groupings;
    (c) selecting an image grouping that is most relevant to a user profile that has been generated from a user's answers to a plurality of background queries;
    (d) providing a random number generator for randomly selecting any image from the selected image grouping;
    (e) providing a random number generator for randomly selecting any annotation from a selected annotation grouping that is categorically related to the selected image grouping; and
    (f) combining the randomly selected image and the randomly selected annotation to form a personalized composite image.

2. The method as in claim 1, further comprising the step of providing a semantic interpreter for converting user input responses into computer usable form.

3. The method as in claim 2, further comprising the step of providing an image composer for combining two images or an image with an annotation.

4. The method as in claim 3, further comprising a microprocessor for directing operations of the semantic interpreter, random number generator and image composer.

5. The method as in claim 1, wherein step (a) includes grouping the plurality of images into a plurality of different groupings.

6. The method as in claim 5, wherein step (b) includes grouping the plurality of annotations into a plurality of different groupings.

7. The method as in claim 6 further comprising the step of storing the grouping of images and grouping of annotations on a database.

8. The method as in claim 5, wherein step (b) includes grouping the plurality of annotations into a plurality of different groupings.

9. A method for producing a personalized composite image, the method comprising the steps of:
    (a) inputting a user's captured image,
    (b) storing a plurality of image groupings that each contain a plurality of stored images;
    (c) selecting an image grouping that is most relevant to a user profile that has been generated from a user's answers to a plurality of background queries;
    (d) providing a random number generator for randomly selecting any image from the selected image grouping; and (e) combining the captured image and the selected stored image.

10. The method as in claim 9, further comprising the step of providing a semantic interpreter for converting user input responses into computer usable form.

11. The method as in claim 10, further comprising the step of providing an image composer for combining the two images.

12. The method as in claim 11, further comprising a microprocessor for directing operations of the semantic interpreter, random number generator and image composer.

13. The method as in claim 9, wherein step (a) includes grouping the plurality of theme images into a plurality of different groupings.

14. A method for producing a personalized composite image, the method comprising the steps of:
    (a) inputting a user's captured image;
    (b) storing a plurality of annotation groupings that each contain a plurality of annotations;
    (c) selecting an annotation grouping that is most relevant to a user profile that has been generated from a user's answers to a plurality of background queries;
    (d) providing a random number generator for randomly selecting any annotation from the selected annotation groupings; and
    (e) combining the user's captured image and the selected annotation to produce the personalized composite image.

15. The method as in claim 14, further comprising the step of providing a semantic interpreter for converting user input responses into computer usable form.

16. The method as in claim 15, further comprising the step of providing an image composer for combining two images or an image with an annotation.

17. The method as in claim 16, further comprising a microprocessor for directing operations of the semantic interpreter, random number generator and image composer.

18. The method as in claim 14, wherein step (a) includes grouping the plurality of images into a plurality of different groupings.

19. A method for producing a personalized composite image from a user profile, the method comprising the steps of:
    (a) inputting the user profile that has been generated from a user's answering a plurality of background queries;
    (b) storing a plurality of image groupings that each contain a plurality of stored images,
    (c) selecting an image grouping based on the user profile;
    (d) providing a random number generator for randomly selecting a stored image from the selected image grouping; and
    (e) combining information correspondingly related to the user profile and the selected stored image to produce the personalized composite image.

20. The method as in claim 19, further comprising the step of providing a semantic interpreter for converting user input responses into computer usable form.

21. The method as in claim 20, further comprising the step of providing an image composer for combining two images or an image with an annotation.

22. The method as in claim 21, further comprising a microprocessor for directing operations of the semantic interpreter, random number generator and image composer.

23. The method as in claim 19, wherein step (a) includes grouping the plurality of images into a plurality of different groupings.

24. An image processing apparatus for producing a composite image, the apparatus comprising:
    (a) means for storing a plurality of image groupings that each contain a plurality of stored images;
    (b) means for storing a plurality of annotation groupings that each contain a plurality of annotations, the annotation groupings being mated to the image groupings,
    (c) means for selecting an image grouping and an annotation grouping based on a user profile;
    (d) a random number generator for randomly selecting a stored image and any annotation from the selected mated image and annotation grouping; and
    (e) a composition unit for combining the randomly selected image and the randomly selected annotation for producing the composite image.

25. The apparatus as in claim 24, further comprising a semantic interpreter for converting user input responses into computer usable form.

26. The apparatus as in claim 25, further comprising an image composer for combining two images or an image with an annotation.

27. The apparatus as in claim 26, further comprising a microprocessor for directing operations of the semantic interpreter, random number generator and image composer.

28. The apparatus as in claim 24, wherein said storing image means includes grouping the plurality of images into a plurality of different groupings.

29. The apparatus as in claim 28, wherein said storing annotation means step includes grouping the plurality of annotations into a plurality of different groupings.

30. The apparatus as in claim 29 further comprising means for storing the grouping of images and grouping of annotations on a database.

31. An apparatus for producing a personalized composite image, the apparatus comprising:
    (a) means for inputting a captured image,
    (b) means for storing a plurality of image groupings that each contain a plurality of stored images;
    (c) means for selecting an image grouping that is most relevant to a user profile that has been generated from a user's answers to a plurality of background queries;
    (d) a random number generator for randomly selecting a image; and
    (e) a composition unit for combining the captured image and the randomly selected stored image to produce personalized composite image.

32. The apparatus as in claim 31, further comprising a semantic interpreter for converting user input responses into computer usable form.

33. The apparatus as in claim 32, further comprising an image composer for combining the two images.

34. The apparatus as in claim 33, further comprising a microprocessor for directing operations of the semantic interpreter, random number generator and image composer.

35. The apparatus as in claim 31, wherein said inputting means includes means for grouping the plurality of theme images into a plurality of different groupings.

36. The apparatus as in claim 31, wherein said storing means includes means for grouping the plurality of annotations into a plurality of different groupings.

37. An apparatus for producing a personalized image, the apparatus comprising:
    (a) means for inputting a captured image;
    (b) means for storing a plurality of annotation groupings that each contain a plurality of annotations;

(c) means for selecting an annotation grouping that is most relevant to a user profile that has been generated from a user's answers to a plurality of background queries;

(d) a random number generator for randomly selecting any annotation from the selected grouping; and (e) a composition unit for combining the captured image and the randomly selected annotation.

38. The apparatus as in claim 37, further comprising a semantic interpreter for converting user input responses into computer usable form.

39. The apparatus as in claim 38, further comprising an image composer for combining two images or an image with an annotation.

40. The apparatus as in claim 39, further comprising a microprocessor for directing operations of the semantic interpreter, random number generator and image composer.

41. The apparatus as in claim 37, wherein said inputting means includes means for grouping the plurality of images into a plurality of different groupings.

42. An apparatus for producing a personalized composite image from a user profile that has been generated from a user answering a plurality of background queries, the apparatus comprising:

(a) means for inputting the user profile;

(b) means for storing a plurality of image groupings that each contain a plurality of stored images, (c) means for selecting an image grouping corresponding to the user profile;

(d) a random number generator for randomly selecting any stored image from the selected grouping; and (e) a composition unit for combining information related to the user profile and the randomly selected stored image.

43. The apparatus as in claim 42, further comprising a semantic interpreter for converting user input responses into computer usable form.

44. The apparatus as in claim 43, further comprising an image composer for combining two images or an image with an annotation.

45. The apparatus as in claim 44, further comprising a microprocessor for directing operations of the semantic interpreter, random number generator and image composer.

46. The apparatus as in claim 42, wherein said inpoutting means includes means for grouping the plurality of images into a plurality of different groupings.

* * * * *

UNITED STATES PATENT AND TRADEMARK OFFICE
CERTIFICATE OF CORRECTION

PATENT NO.     : 6,269,366 B1
DATED          : July 31, 2001
INVENTOR(S)    : Charles E. Romano et al.

It is certified that error appears in the above-identified patent and that said Letters Patent is hereby corrected as shown below:

<u>Column 5,</u>
Line 2, after "image" insert -- with a selected annotation grouping --.

<u>Column 6,</u>
Line 9, after "profile" insert -- that has been generated from a user's answers to a plurality of background queries --.

<u>Column 8,</u>
Line 10, after "image" insert -- and a selected annotation --.

Signed and Sealed this

Thirteenth Day of August, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.   : 6,269,366 B1
DATED        : July 31, 2001
INVENTOR(S)  : Charles E. Romano et al.

It is certified that error appears in the above-identified patent and that said Letters Patent is hereby corrected as shown below:

<u>Column 5,</u>
Line 2, after "image" insert -- with a selected annotation grouping --.

<u>Column 6,</u>
Line 9, after "profile" insert -- that has been generated from a user's answers to a plurality of background queries --.
Line 45, after "image" insert -- and a selected annotation --.

<u>Column 8,</u>
Line 10, after "image" insert -- and a selected annotation --.

Signed and Sealed this

Tenth Day of September, 2002

*Attest:*

JAMES E. ROGAN
*Director of the United States Patent and Trademark Office*

*Attesting Officer*